United States Patent
Basso

[11] Patent Number: 5,826,497
[45] Date of Patent: Oct. 27, 1998

[54] DEVICE FOR ROASTING MEAT AND FOR SUPPORTING MEAT DURING ROASTING THEREOF

[76] Inventor: Cecilia Basso, Vidt 1923, Buenos Aires, Argentina, 1425

[21] Appl. No.: 676,437

[22] Filed: Jul. 8, 1996

[30] Foreign Application Priority Data

Jul. 7, 1995 [AR] Argentina ................. 332689

[51] Int. Cl.$^6$ ................................. A47J 37/00
[52] U.S. Cl. .................... 99/446; 99/400; 99/421 V; 99/427; 99/448
[58] Field of Search ............. 99/400, 401, 339, 99/340, 419–421 V, 444–450, 426, 427; 126/25 R, 9 R; 426/523

[56] References Cited

U.S. PATENT DOCUMENTS

| | | | |
|---|---|---|---|
| 3,640,209 | 2/1972 | Wilson | 99/446 |
| 3,811,374 | 5/1974 | Mann | 99/450 X |
| 3,938,494 | 2/1976 | Clark | 99/339 X |
| 4,062,275 | 12/1977 | Appel et al. | 99/400 X |
| 4,378,729 | 4/1983 | Pierick | 99/400 |
| 4,384,513 | 5/1983 | Pierick | 99/447 X |
| 4,438,684 | 3/1984 | Geissmann | 99/421 V |
| 4,731,252 | 3/1988 | Duncan | 99/446 |
| 5,033,365 | 7/1991 | Rao et al. | 99/400 X |
| 5,184,540 | 2/1993 | Riccio | 126/25 R |
| 5,359,988 | 11/1994 | Hait | 126/25 R |
| 5,361,685 | 11/1994 | Riccio | 99/421 H |
| 5,465,653 | 11/1995 | Riccio | 99/446 X |

FOREIGN PATENT DOCUMENTS 188457  1/1972  Argentina .

*Primary Examiner*—Timothy F. Simone
*Attorney, Agent, or Firm*—Jacobson, Price, Holman & Stern, PLLC

[57] ABSTRACT

A device for cooking meat and supporting meat during cooking thereof comprising a mechanism for supporting the meat during cooking; a mechanism for guiding the oils and juices liberated during the cooking; and a heat source positioned in relation to the supporting mechanism. The device comprises at least one vertically disposed hollow column having multiple perforations, the lower end of which column is connected to an anchoring mechanism which can be connected to a rotating mechanism; and at least one plate disposed on the column, which plate has a fastening bushing with perforations, wherewith the perforations of the column and of the bushing associated with each plate are of two types, one type which serves, along with a fastener to fasten the plate(s) to the column, and the other type (with the perforations of the bushing and the column in alignment) which serves for passage of oils and juices collected by the plate into the hollow column and through the interior of the column to be discharged; wherewith each of the plates has a slightly concave configuration, and wherewith hooks for suspending the meat to be roasted are provided on the bottom face of the plate.

9 Claims, 1 Drawing Sheet

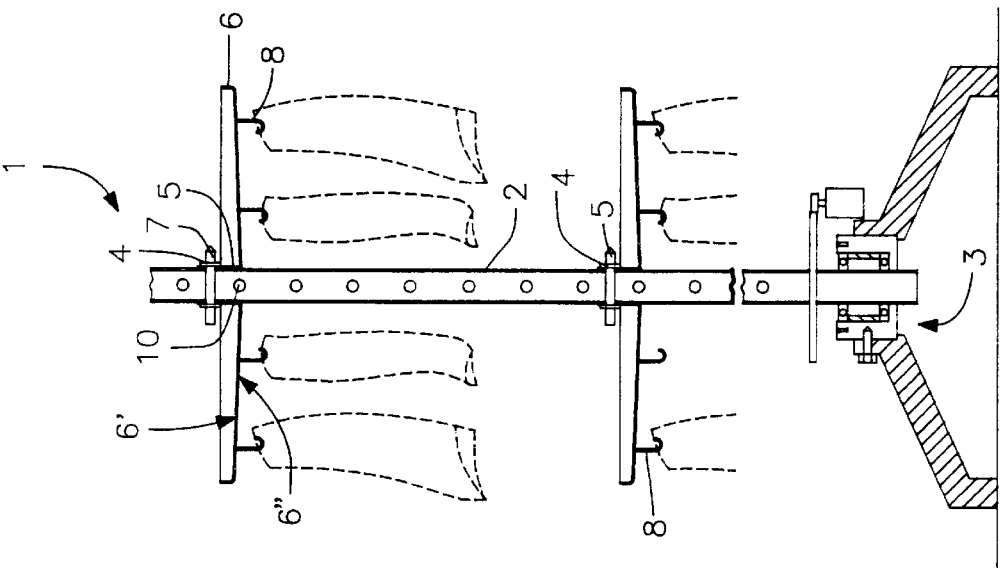
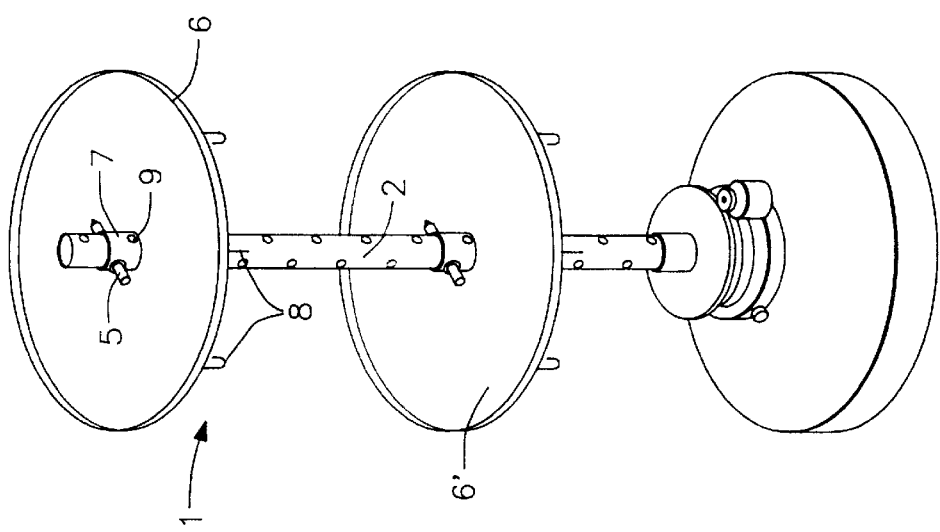

DEVICE FOR ROASTING MEAT AND FOR SUPPORTING MEAT DURING ROASTING THEREOF

The invention relates to a device for roasting meat and/or supporting meat during roasting of the meat. The device has a number of important advantages over known such devices, as will be described in detail hereinbelow.

Known devices for roasting meat may be categorized as follows:

A grill, disposed essentially horizontally, having a source of heat disposed below the grill (or grate) surface. The heat may be provided by combustion of a fuel which may be biomass carbon or mineral carbon (e.g. of fossil origin), and in particular may be charcoal;

Rotary skewers, disposed horizontally, [wherein each skewer is rotatably driven on lateral pivots, wherein a source of heat is disposed below or above each skewer or a horizontal array of such skewers, which heat source may be, e.g., a gas burner; and A rotisserie cage in which the meat to be roasted is held between a plurality of elongated members or skewers, having a source of heat disposed around the cage, which heat source may be, e.g., charcoal.

Each of these means of cooking meat is associated with its own problems. A grill uses charcoal or the like, which generates hot gases which, when they contact the food, cause the food to release oils and juices which fall back onto the heat source where they are heated to high temperatures and produce undesirable gases which subsequently contact and penetrate into the food, with effects which are deleterious to the digestion of the food. Further, the prolonged contact of the food with the self-generated oils and juices during the cooking is detrimental to the cooking conditions.

The disadvantage of horizontal skewers disposed in an arrangement where some skewers are disposed vertically above other skewers is that during cooking the oils and juices released by the meat on a given skewer descend onto the meat held on the skewer disposed below the given skewer. The effects of this tend to be detrimental to the cooking process, and to the taste and aroma of the final cooked product. Further, problems are created if one attempts to dispose meats of different types, e.g. beef and chicken, on the same array. The result is an unsatisfactory mixing of tastes.

The problems presented by apparatuses employing roasting cages and the like are similar to those described above. The mixing of different types of meats is not accommodated, and the cooking with charcoal generates effects which are undesirable with respect to the digestion of the food.

Further disadvantages of all of the known devices are as follows:

They require substantial space for their operation;

They contribute to atmospheric contamination in that they generate carbon dioxide;

They are wasteful of heat energy in that they operate in the open rather than in an enclosure which would increase thermal efficiency;

They are noncompliant with rules (or are inconsistent with recommendations) for ecological conservation, in that they promote the consumption of wood as a heat source, and moreover in that the gases they generate (e.g. carbon dioxide) and which are vented to the atmosphere are harmful to farms and forests and the environment in general.

SUMMARY OF THE INVENTION

The device according to the present invention was developed for the purpose of eliminating all of these disadvantages of the known devices. The inventive device allows meats of different types to be cooked without the danger of mixing tastes. Further, it does not allow meat which is being cooked to come into contact with its self-generated oils and juices; rather, said oils and juices are largely removed, by simple and easy means.

The most important characteristics of the invention are that it enables one to cook different types of meats simultaneously without said meats being essentially sauteed in some type of juice or oil, and to produce a wholesome and acceptable cooked product which is free from impregnation by constituents of undesirable fumes.

The principal claimed matter of the invention is a device for cooking of meat and for supporting meat during cooking thereof, comprised of a central hollow column having multiple perforations, to which column discs are coupled. Each such disc collects juices from the meat cooking above it. The bottom side of each such disc bears hooks on which the meat is hung.

With this arrangement, the juices and oils which are liberated from the meat fall onto the disc disposed below the meat and do not contact the other pieces of meat; therefore, different types of meat can be hung on different hooks. The plates are concave, whereby the juices and oils tend to flow toward the hollow column, and into the column through the perforations in the column, whence they flow through the column and are discharged.

Some known devices are designed to solve some of the problems which the present invention solves; however, the means offered by the known devices are more complex and costly. For example, Argentine Pat. No. 188,457 is comprised of a tray penetrated vertically by a rotating rod driven by a motor. The upper part of the rod has a plate fixed to it. A spur gear is mounted below the tray; this gear drives satellite gears distributed around its periphery, wherewith each satellite gear is mounted on a respective rotating rod which also extends through the tray and which has a universal joint which connects to the lower end of a skewer or the like, wherewith the opposite (free) end of the skewer is supported on the perimeter of the plate on the main rotating rod.

It is seen that the device described in said prior patent does allow different types of meats to be roasted; however, its complex mechanism is a burden upon the user in that appreciable regular maintenance of the mechanism is required and in that the mechanism can eventually jam. The costs of these disadvantages render the prior art device impracticable.

Another advantage of the present invention is that it allows one to use a heat source of a relatively non-contaminating type, such as gas or electricity, thereby further avoiding the presence of gases and fumes which impregnate the food (as described above) (e.g. in the case of a device which burns charcoal or wood).

The heat sources may be, in particular:

electrical resistance heaters comprising quartz tubes or steel elements, in a suitable configuration and in suitable numbers;

infrared heating panels employing natural gas; or brazier-like configurations with a heat source and a reflector.

The heat source may be disposed in the center of or around or laterally of the group of pieces of meat being cooked. An enclosure may be provided at the periphery, comprised of a thermal [i.e. refractory] glass, which enables increasing the thermal yield of the heat source while still allowing the meat to be continually viewed during cooking. The viewability is particularly desirable for applications in restaurants, cafés and the like.

In cases where it is desired to use charcoal or wood, the combustion gases generated are carried upward with the convection updraft produced by the heat source. This minimizes contact with the meat, so that the final meat product is only minimally contaminated by combustion gases.

To summarize: The invention relates to a device for supporting meat during cooking or roasting of the meat, comprising:

means of fixing the meat in place during cooking;

means of guiding the oils and juices liberated during the cooking; and a heat source positioned in a certain relation to said fixing means, the device further comprising at least one hollow column having multiple perforations, the lower end of which column being rotatably connected to supporting and anchoring means which can be connected to means for transmitting rotational movement, wherein the perforations provide means for fixing at least one plate of slightly concave configuration to the column wherein hooks for suspending the meat to be cooked are provided on the bottom face of the plate, and wherein the device further comprises means for confining and guiding the oils and juices collected by the hollow column via the interior of the column.

The above-described advantages are only some of the most notable advantages afforded by the invention. These and others will be apparent from the description herein, in conjunction with the accompanying drawings, with the understanding that the description of preferred embodiments and the drawings are offered only by way of example and do not limit the scope of the invention.

BRIEF DESCRIPTION OF THE DRAWINGS

FIG. 1 is an overall perspective view of the proposed roasting support device; and FIG. 2 is a schematic vertical cross section of the device, showing clearly the disposition of the plates with respect to the perforated central hollow column, and the means for achieving connection of the plates to the column.

DESCRIPTION OF THE PREFERRED EMBODIMENTS

In the embodiment shown, the device 1 has at least one central hollow column 2 which may be comprised of any suitable material (e.g. aluminum or steel). This column is mounted vertically with the aid of anchor and support means 3 disposed in relation to i.e. connected to the base. The column has two types of perforations which are designated perforations for fastening 4 and perforations for passing fluids 10. Each type of perforation occurs in pairs. The fastening perforations 4 should be mutually aligned, to allow insertion of a pin 5 whereby a plate 6 having a central bushing 7 is fixed (via the bushing) to the hollow column 2. The second type of perforation is provided in both the bushing 7 and the column 2, enabling juices and oils from the cooking to be withdrawn. The bushing 7 has at least one of the passing perforations 9, which perforations are not aligned with the fastening perforations 4 but rather align with corresponding passing perforations 10 in the column.

The upper face 6' of the plate is concave, with an inclination descending from the perimeter of the plate to the hollow column, so as to guide the juices and oils, as will be described hereinafter. The lower face 6" of the plate has a series of hooks 8 for holding the meat to be cooked. The hooks are separated sufficiently that different types of meat can be hung simultaneously (e.g. beef, chicken, etc.).

The above description of the physical structure and arrangement of the device is complemented by the following description of the manner of use of the inventive device: Fixed means of support are provided, apart from the roasting device proper. These support means support one or more columns 2 while all of the above-described elements are being assembled and while the meat to be cooked is being hung. After assembly of the column assembly and hanging of the meat, the entire ensemble is removed from the fixed auxiliary support and mounted in the roasting apparatus, ready to begin the cooking. The support facility for assembly purposes allows all of the preparatory steps to be carried out away from the hot zone of the roasting apparatus. This allows an apparatus having multiple columns to be operated wherewith such columns are periodically being removed and replaced, which is preferable to having to hang and remove individual pieces of meat while operating in the hot zone.

To prepare a column 2, it is mounted vertically on the auxiliary fixed support. The bottommost collector plate 6 is mounted by sliding its bushing 7 over the column 2 until the lower pair of perforations 4 on the column (by which perforations 4 the bushing 7 is to be fixed to the column 2 with the aid of the pin 5) are aligned with the fastening perforations 4 in the bushing 7. If desired, meat is mounted on the hooks below bottommost collector plate 6. Then the next to bottommost collector plate is mounted in similar fashion, at a distance which enables portions of the meat to be cooked to be disposed in the space between the plates. The meat is mounted on the hooks 8 of the second plate 6, and then the next plate 6 is mounted on the column 2; and so forth, until all the plates 6 to be mounted over the vertical course of the column 2 have been mounted. The plate 6 disposed below each portion of meat, having a slope of prescribed steepness, collects the juices and oils from the respective portion and guides them to the interior of column 2 for removal.

The distance between successive plates may be adjusted depending on the sizes of the pieces of meat to be cooked. Different types and quantities of meats may be cooked simultaneously. The assembly comprised of the column and plates is held over a support 3; the support may have attached to it means for transmitting rotational movement which drives the column 2 in rotary fashion (along with the plates 6 and the food connected to the plates 6) to achieve uniform cooking. The (optional) rotation of the column 2 provides energy savings, because it allows the meat to be positioned near the heat source without the risk of burning the meat, and it reduces losses of useful heat.

When positioning one of the bushings 7 on the column 2, or removing it from the column 2, light manual pressure should be used. Juices and oils which may be present between the bushing and column are not detrimental to the result sought, because the small amount of these materials which is dislodged ("which leaks") will not plug the small gap but will flow or be urged down the exterior of the column without affecting the food being cooked.

I claim:

1. A device for cooking meat, comprising:

means for supporting the meat during cooking;

means for guiding oils ad juices liberated during the cooking; and a heat source positioned in relation to said means for supporting the meat, wherein the device comprises:

at least one vertically disposed hollow column having multiple perforations, a lower end of which column is connected to anchoring means which can be connected to means for imparting rotational movement, and at least one plate disposed on said hollow column, which plate has a fastening bushing with perforations, wherein the perforations of the column and of the bushing associated with each plate are of two types, one type which serves, along with fastener means, for fastening of said at least one plate to the hollow column, and the other type which serves for passage of oils and juices collected by said at least one plate onto the hollow column and through the interior of said column to the discharged when said other type of perforations in the column are aligned with said other type of perforations of the plates; wherein each of the plates has a slightly concave configuration, and wherein hooks for holding the meat to be roasted are provided on a bottom face of said at least one plate.

2. The device for cooking meat, according to claim 1; wherein the means for transmitting rotational movement are motorized.

3. The device for cooking meat, according to claim 1; wherein the fastener means comprise a pin.

4. A device for supporting meat during roasting thereof, said device comprising:

a substantially vertically arranged column; and at least one plate having at least one meat supporting member for supporting meat below said at least one plate, said at least one plate being mounted to the column and arranged so that any fluids striking a top surface of said at least one plate are drained toward the column, said column being arranged so as to receive said fluids from said at least one plate and prevent said fluids from contaminating meat below said at least one plate.

5. The device of claim 4, wherein said at least one plate is concentrically arranged about said column.

6. The device of claim 4, wherein said column is hollow and includes at least one perforation arranged in relation to said at least one plate so as to receive any fluids drained by said at least one plate and permit flow of said fluids internally through said column.

7. The device of claim 4, and further comprising a plurality of said at least one plate, vertically spaced along said column.

8. The device of claim 4, where said at least one plate is substantially horizontally arranged.

9. The device of claim 4, and further comprising a heat source sufficiently close to said at least one plate so as to cook meat supported by said at least one meat supporting member.

* * * * *